United States Patent
Grimes

(10) Patent No.: US 8,365,635 B2
(45) Date of Patent: Feb. 5, 2013

(54) HANDLEBAR END CAPS

(76) Inventor: Earl David Grimes, Yucaipa, CA (US)

( * ) Notice: Subject to any disclaimer, the term of this patent is extended or adjusted under 35 U.S.C. 154(b) by 425 days.

(21) Appl. No.: 11/833,096

(22) Filed: Aug. 2, 2007

(65) Prior Publication Data

US 2009/0031847 A1    Feb. 5, 2009

(51) Int. Cl.
*B62K 21/26* (2006.01)
*B62K 21/12* (2006.01)

(52) U.S. Cl. ...................... 74/551.9; 74/551.8

(58) Field of Classification Search .......... 74/551.9, 74/551.8; 81/427.5, 489, 492; 16/441, 111.1, 16/421, 436; 403/332, 375; 285/116, 38
See application file for complete search history.

(56) References Cited

U.S. PATENT DOCUMENTS

| | | | |
|---|---|---|---|
| 3,606,325 A | 9/1971 | Lamkin et al. | |
| 4,195,837 A | 4/1980 | Poulin | |
| 4,852,423 A | 8/1989 | Mikami et al. | |
| 5,390,965 A * | 2/1995 | Few | 285/116 |
| 5,526,724 A * | 6/1996 | Bruggeman | 81/492 |
| 5,895,329 A | 4/1999 | Huang | |
| 5,934,154 A | 8/1999 | Noel | |
| 6,112,618 A | 9/2000 | Yates | |
| 6,263,759 B1 * | 7/2001 | Hollingsworth et al. | 74/551.9 |
| 6,615,687 B2 * | 9/2003 | Bendetti et al. | 74/551.9 |
| 6,718,675 B1 | 4/2004 | Lu | |
| 7,942,077 B2 * | 5/2011 | Lai | 74/551.9 |

FOREIGN PATENT DOCUMENTS

| | | |
|---|---|---|
| GP | 2845 | 10/1995 |
| GP | 2846 | 12/1995 |

\* cited by examiner

*Primary Examiner* — Richard W Ridley
*Assistant Examiner* — Daniel Yabut
(74) *Attorney, Agent, or Firm* — Kenneth L. Green

(57) ABSTRACT

End caps are retained by handlebar grip clamps. The grip clamps include recesses to attach to protrusions on an outside end of handlebar grips, interior circumferential portions which clamp against the handlebar, and outward facing mouths with inside grooves. The grip clamps may be loosely attached to the handle grips allowing insertable portions of the end caps to be inserted into the mouths. The insertable portions include tapered portions to facilitate insertion into the mouths of the loosely tightened clamps, and raised captured portions and recessed portions for retention of the end caps by the inside grooves of the mouths. The grip clamps may then be tightened onto the handlebars and thereby both lock the handlebar grips onto the handlebars and retain the end caps. Damaged end caps may later be replaced by loosening the clamps without requiring removal of the clamps or the grips for easy repair.

20 Claims, 3 Drawing Sheets

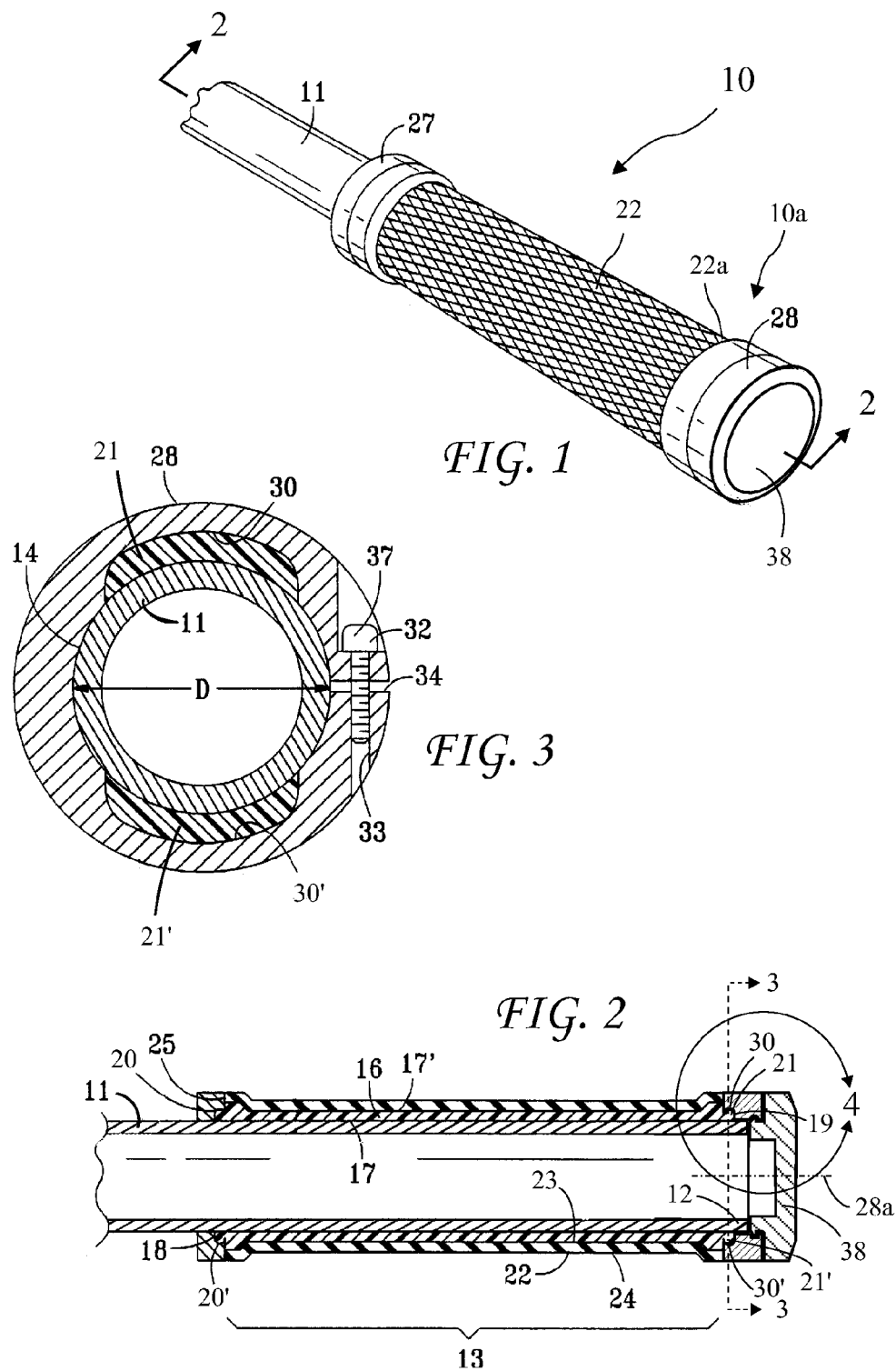

HANDLEBAR END CAPS

BACKGROUND OF THE INVENTION

The present invention relates to handlebar grip end caps and in particular to handlebar end caps including an engaging ring to attach the end caps.

Handlebars are used on motorcycles, bicycles, all-terrain vehicles (ATVs), watercraft and snowmobiles. Such handlebars generally include grips and end caps for closing off the ends of handlebars. Soft grips are desirable both for comfort and for control but unfortunately, make it difficult to secure an end cap at the outer end thereof. If the end cap is molded in the soft grip, it can be torn off by contact between the handlebar end and the ground. Alternatively, if grooves are formed at the end of the soft grip they do not provide sufficient structural strength to hold an end cap in place.

Several approaches have been taken to hold an end cap on a handle grip. U.S. Pat. No. 4,852,423 shows a soft grip with an end cap which is secured in a groove in the grip which is expanded by placing the grip over the handlebar. Unfortunately, the end cap is still supported by only the soft rubber grip. U.S. Pat. No. 6,112,618 provides a bicycle handgrip requiring an inside depending sidewall and an outside depending sidewall when the grip is molded from a soft material as desired. There is not sufficient structure to securely hold the end cap in place. U.S. Pat. No. 6,615,687 utilizes an end cap which is screwed into a ring. The ring in turn is held by a tubular insert. This provides a relatively expensive assembly with numerous parts and thus is impractical for most handlebar grips.

U.S. Pat. No. 5,934,154 provides a protective end cap which is an enlarged end cap to protect the user from impalement by the equipment handle. Such an end cap would be impractical for most bicycles, motorcycles and the like and would be readily knocked off when the end of the handlebar contacts the ground.

Golf clubs typically have end caps but such end caps do not have the same vulnerability to be struck against the ground as for instance a bicycle grip end cap. Various golf club end caps are shown in U.S. Pat. Nos. 3,606,325; 4,195,837; 5,895,329; and 6,718,675.

Another problem with soft grips is they tend to twist over the handlebar. Various anti-twist structures are disclosed in the prior art. U.S. Pat. No. 6,263,759 for "Removable, Non-turning Handlebar Grip," filed by the present inventor, disclosed a soft grip with clamps at each end to fix the position of the grip on the handlebars. The clamps of the '759 patent solved the problem of removably retaining the soft grips on handlebars, but obstruct the attachment of known end caps to the handlebars. The '759 patent does not teach any way of securing an end cap thereto and thus there is a need for a structure which will securely hold an end cap onto a grip even though the grip portion is made from a relatively soft material. The '759 patent is herein incorporated by reference.

BRIEF SUMMARY OF THE INVENTION

The present invention addresses the above and other needs by providing end caps which are retained by handlebar grip clamps. The grip clamps include recesses to attach to protrusions on an outside end of handlebar grips, circumferential portions which clamp against the handlebar, and outward facing mouths with inside grooves. The grip clamps may be loosely attached to the handle grips allowing insertable portions of the end caps to be inserted into the mouths. The insertable portions include tapered portions to facilitate insertion into the mouths of the loosely tightened clamps, and raised captured portions and recessed portions for retention of the end caps by the inside grooves of the mouths. The grip clamps may then be tightened onto the handlebars and thereby both lock the handlebar grips onto the handlebars and retain the end caps. Damaged end caps may later be replaced by loosening the clamps without requiring removal of the clamps or the grips for easy repair.

In accordance with one aspect of the invention, there is provided a handlebar grip and end cap assembly including a hollow grip, a clamp, and an end cap. The hollow grip resides over a handlebar end and includes an outside grip end with arced protrusions. The clamp resides adjacent to the outside grip end and includes recesses in an inner end of the clamp for cooperation with the protrusions to grasp the grip, interior circumferential portions for clamping the clamp against the handlebar end, and an outer end of the clamp. The outer end includes a mouth residing inside the outer end and an inside groove residing inside the mouth. The end cap resides adjacent to the outer end of the clamp and includes a face facing outward from the grip, a substantially cylindrical waist residing between the face and the outer end of the grip, and an insertable portion opposite the face and protruding from the waist and removably insertable into the mouth of the outer clamp. The insertable portion includes a tapered portion, a capture portion, and a recessed portion. The tapered portion is farthest from the waist at an innermost end of the insertable portion and tapers from a smaller diameter end facing into the grip to a greater diameter end opposite the smaller diameter end. The captured portion residing adjacent to the tapered portion and has approximately the same diameter as the greater diameter end of the tapered portion. The recessed portion between the captured portion and the waist and having a smaller diameter than the captured portion. A radially extending first wall resides between the recessed portion and the captured portion.

In accordance with one aspect of the invention, there is provided a handlebar grip and end cap assembly including a hollow grip, an outer clamp, and an end cap. The hollow grip resides over a handlebar end and has an outside grip end. The outer clamp resides adjacent to the outside grip end and grasps the grip and grasps the handlebars. The outside clamp includes an outer end, a mouth residing inside the outer end, and an inside groove residing inside the mouth. The inside grove has a groove face defining an outside edge of the groove and is approximately orthogonal to an axial centerline through the clamp. The end cap resides adjacent to the outer end of the clamp and includes a face facing outward from the grip, a substantially cylindrical waist residing between the face and the outer end of the grip, and an insertable portion opposite said face and protruding from said waist and removably inserted into the mouth of the outer clamp. The insertable portion includes a tapered portion, a captured portion, and a recessed portion. The tapered portion resides at an innermost end of the insertable portion and tapers from a smaller diameter end facing into the grip to a greater diameter end opposite the smaller diameter end. The captured portion resides adjacent to the tapered portion and has approximately the same diameter as the greater diameter end of the tapered portion. The recessed portion resides adjacent to and behind the captured portion and having a smaller diameter than the captured portion. A first wall extends radially between the recessed portion and the captured portion and a sharp edge resides between the first wall and the captured portion.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is a perspective view of a grip, a clamp, and an end cap according to the present invention on a handlebar end.

FIG. 2 is a cross-sectional view of the grip, clamp, and end cap taken along line 2-2 of FIG. 1.

FIG. 3 is a cross-sectional view of the grip, clamp, and end cap taken along line 3-3 of FIG. 2.

Corresponding reference characters indicate corresponding components throughout the several views of the drawings.

DETAILED DESCRIPTION OF THE INVENTION

Figure 5B:
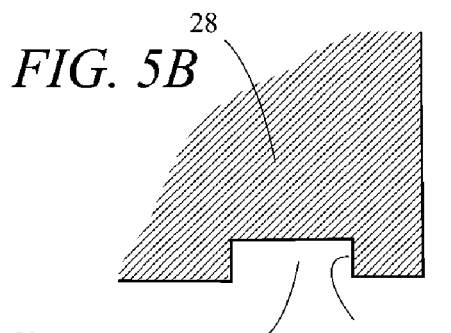
FIG. 5B is a detailed view of a cross-section of a mouth of the outer clamp taken from detail 5 of FIG. 4.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A perspective view of a handlebar grip 10, ridged inner and outer grip clamps 27 and 28, and an end cap 38 according to the present invention, residing at an outer end 10a of the grip 10 on a handlebar end 11, is shown in FIG. 1. The handlebar end 11 represents one end of typical handlebars. The handlebar grip 10 is affixed along a grip receiving length 13 (shown in FIG. 2) of a cylindrical outer surface 14 of the handlebar end 11 (shown in FIG. 3). The handlebar end 11 has an outside diameter D. The handlebar grip 10 has an inner rigid shell 16 which has an inner surface 17 which slides over the cylindrical outer surface 14 of handlebar end 11. The inner rigid shell 16 has an outer surface 17', a first end 18 and a second end 19. A first pair of lengthwise arced protrusions 20 and 20' are formed at the first end 18 of the inner rigid shell 16 and a second pair of lengthwise arced protrusions 21 and 21' having outward faces 21a and 21a' (see FIG. 6) respectively are formed at the second end 19 of the inner rigid shell 16. An outer flexible grip 22 is secured to the outer surface 17' of inner rigid shell 16 and has an outer end 22a. The outer flexible grip 22 has an inner surface 23 which is preferably secured by an adhesive to outer surface 17'. The outer surface 24 of the outer flexible grip 23 is preferably knurled or otherwise covered with a pattern which assists in the holding of the grip. Outer flexible grip 22 has a first end 25 and a second end 26 and can be molded from a relatively soft material to provide rider comfort.

The clamp 27 and the clamp 28, securing the inner rigid shell 16 to the handlebar end 11, are shown in FIG. 2, in a cross-sectional view taken along line 2-2 of FIG. 1. A cross-sectional view of the clamp 28 and arced protrusions 21 and 21' taken along line 3-3 of FIG. 2 is shown in FIG. 3, where the outside diameter D of the handlebar end 11 is indicated. It may also be seen that the lengthwise protrusions 21 and 21' are held within a pair of recesses 30 and 30' of the outer clamp 28. This interconnection is best understood by viewing FIG. 6 which shows the outer clamp 28 and where the shell protrusion receiving recesses 30 and 30' are clearly seen.

The clamps 27 and 28 may be held to the handlebar end 11 in various ways. For example, an Allen screw 32 (or other threaded fastener) spanning a gap 34 and threaded into a threaded opening 33 on an opposite side of the gap 34. Tightening the Allen screw 32 closes the gap 34 forcing the clamp 28 against the handlebar end 11. In use, the inner and outer clamps 27 and 28 are placed over the protrusions 20 and 20' and 21 and 21'. This assembly is slid over the end 12 of the handlebar end 11 and the two rigid clamps 27 and 28 are tightened by tightening Allen screws 32.

The inner rigid shell 16 is preferably fabricated from a durable and impact resistant polymer such as glass filled polypropylene. Of course, the term "rigid" is a relative one. Glass filled polypropylene has some flexibility, but, compared to the grip elastomer, is considered rigid. The clamps 27 and 28 are preferably made of metal, and preferably of aluminum which is considerably more rigid than glass filled polypropylene. The grip 10 is preferably fabricated from a relative soft elastomer such as a plasticized rubber of the type sold under the trademarks J. VON, KRAYTON, and STAR-FLEX having a hardness of typically 15 durometer.

Figure 4:
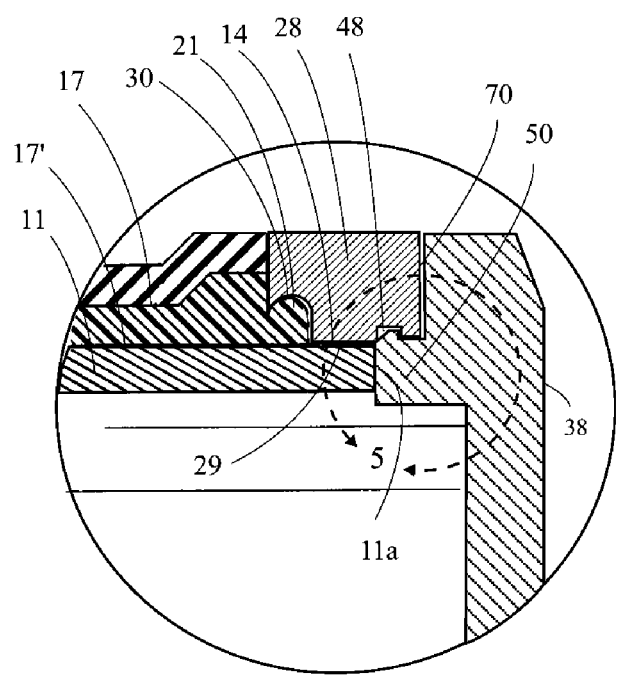
FIG. 4 is a detailed cross-sectional view of the cooperation of the clamp and the end cap taken from detail 4 of FIG. 2.

As can be seen in FIGS. 3 and 4, rigid clamp 28 not only captures protrusion 21 with recess 30, but also clamps against the surface 14 of handlebar end 11 along the inner gripping surface 29 of rigid clamp 28. This metal clamp to metal handlebar contact provides a very secure clamping action against the handlebar end 11 without unduly compressing inner rigid shell 16 or its protrusions 21 and 21'.

Figure 6:
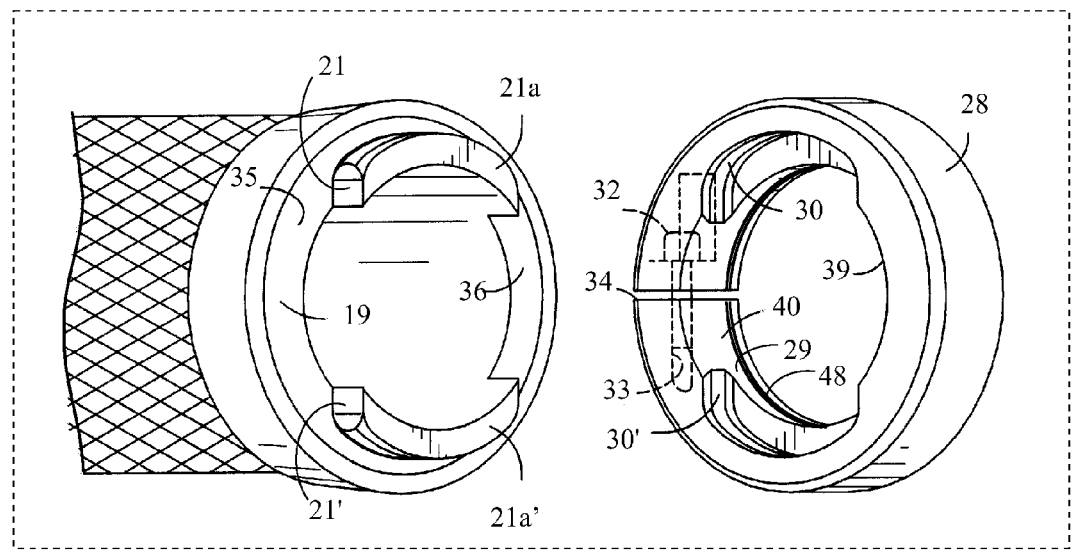
FIG. 6 is an exploded perspective view of cooperating surfaces of the clamp and grip.

Furthermore, there are two interior circumferential surfaces 39 and 40 on an interior surface of each rigid clamp 27 and 28 which also contact the outer surface 14 of handlebar end 11. This further helps to secure the rigid clamps to the handlebar end and thereby secure the inner rigid shell thereto. There are, additionally, pairs of spaces 35 and 36 between protrusions 21 and 21' as shown in FIG. 6, which permit the full contact at surfaces 39 and 40 of the rigid clamps 27 and 28. The result is a pair of handlebar grips which are very securely affixed to the handlebar and yet, can be rapidly removed by loosening Allen screws 32 and sliding off the handlebar and replaced with another grip quickly if desired. The end cap 38 resides over the outer end 10a of the grip 10, and in this instance, over the outer end of the clamp 28.

A detailed cross-sectional view of the cooperation of the clamp 28 and the end cap 38 taken from detail 4 of FIG. 2. is shown in FIG. 4. The engagement of an insertable portion 50 of the end cap 38 into a cylindrical mouth 46 (see FIG. 7) of the clamp 28 allows the securing of the end cap 38 to the clamp 28 and thereby to the grip 10. A captured portion 54 (see FIG. 5A) of the insertable portion 50 engages an inside groove 48 (see FIG. 5B) in the mouth 46 to retain the end cap 38. The position of the insertable portion 50 inside the mouth 46 allows tightening of the Allen screw 32 to also tighten the clamp 28 on the insertable portion 50 of the end cap 38. The insertable portion 50 preferably butts up against an outside end 11a of the handlebar end 11.

Figure 5A:
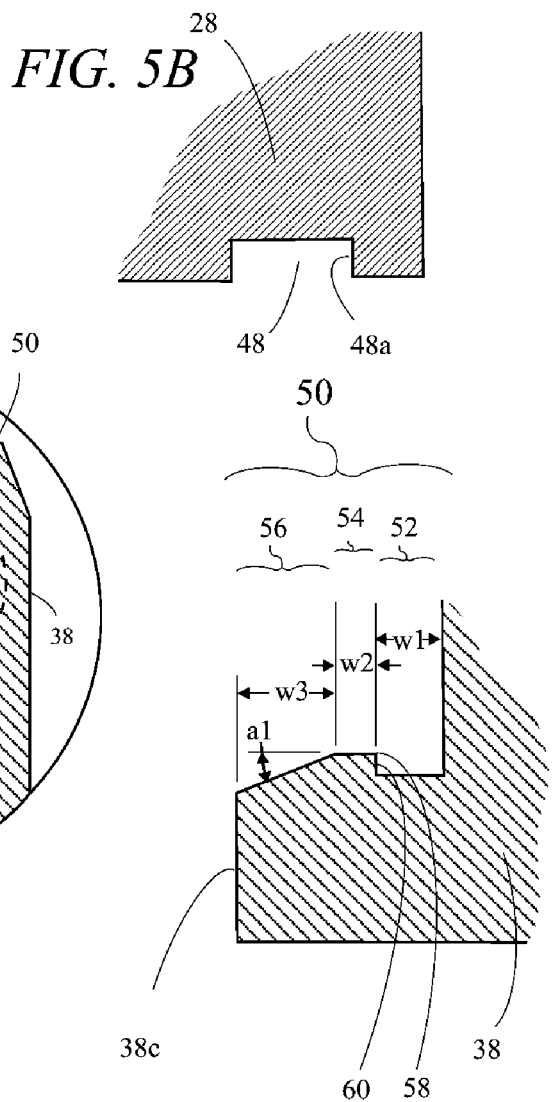
FIG. 5A is a detailed view of a cross-section of a captured portion of the end cap taken from detail 5 of FIG. 4.

A detailed view of a cross-section of an insertable portion 50 of the end cap 38 taken from detail 5 of FIG. 4 is shown in FIG. 5A. The insertable portion 50 includes a tapered portion 56, the captured portion 54, and a recessed portion 52. An axially innermost inside face 38c of the end cap 38 butts axially against the axially outermost outside end 11a (see FIG. 4) of the handlebar 11 with no portion of the end cap 38 extending inward past the outside end 11a of the handlebar 11. The recessed portion 52 is nearest to the belt (or waist) 38b (see FIG. 8) is preferably cylindrical and preferably extends axially (i.e., approximately coaxial with the axis 28a of the clamp 28) a distance w1 between approximately 0.026 inches and approximately 0.034 inches, and is preferably between approximately 0.006 inches and approximately 0.010 inches deep. The captured portion 54 is adjacent to the recessed portion 52 and is preferably approximately cylindrical and approximately coaxial with the axis 28a and preferably extends axially a distance w2 of between approximately 0.006 inches and approximately 0.014 inches. The tapered portion 56 is adjacent to the capture portion 54 and opposite the recessed portion 52 and is preferably approximately frusto-conical in shape and approximately coaxial with the axis 28a and preferably extends axially a distance w3 between approximately 0.015 inches and approximately 0.025 inches and preferably has a taper a1 from a greater diameter adjacent to the captured portion 54 to a smaller diameter, of between approximately 29 degrees and approximately 31 degrees, and more preferably has a taper of approximately 30 degrees. A first wall 60 separates the captured portion 54 from the recessed portion 52. The first wall 60 is preferably flat and resides approximately orthogonal to the axis 28a and preferably meets the captured portion 54 at a sharp corner 58.

A detailed view of a cross-section of a portion of the mouth 46 of the outer clamp 28 taken from detail 5 of FIG. 4 is shown in FIG. 5B. The mouth 46 includes the inside groove 48 for retaining the insertable portion 50 in the mouth 46. The inside groove 48 includes a second wall 48a radially overlapping for cooperation with the first wall 60 to retain the end cap 38 in the outer clamp 28. The second wall 48a is preferably approximately orthogonal to the axis 28a (see FIG. 2) of the clamp 28 and the inside groove 48 preferably has a rectangular cross-section and is preferably approximately 0.040 inches wide and approximately 0.012 inches deep.

An exploded perspective view of cooperating surfaces of the outer clamp 28 and grip 10 is shown in FIG. 6. The recesses 30 and 30' are concave and capture the protrusions 20 and 20' so that one clamp 27 or 28 may hold the handlebar grip 10 on the handlebar end 11 since it cannot slide out of the clamp 27 or 28 when clamp 27 or 28 is tightened.

Figure 7:
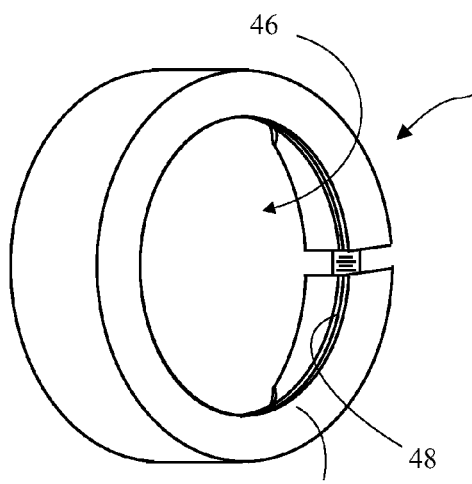
FIG. 7 is a perspective view of the outer clamp showing the mouth and inside groove.

A perspective view of the outer clamp 28 showing the mouth 46 and the inside groove 48 is shown in FIG. 7. The outer clamp 28 includes an outer face 70.

Figure 8:
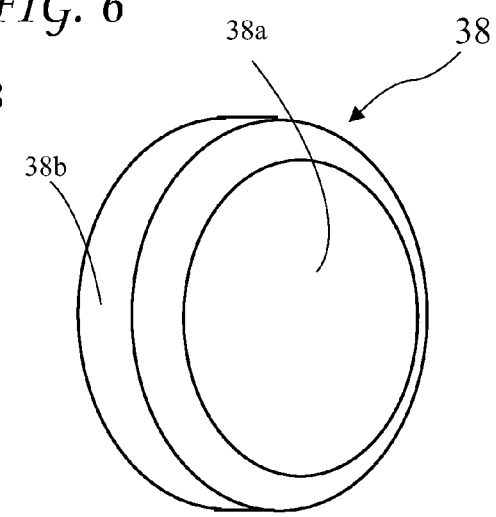
FIG. 8 is a perspective view of an end cap according to the present invention.

A perspective view of the cap end 38 showing a face 38a and a waist 38b is shown in FIG. 8. The face 38a is preferably substantially round, for example, has at least a round appearance, but may also be oval or polygonal shaped and closes the outer end of the grip 10. The belt 38b preferably comprises a substantially cylindrical exterior surface coaxial with the grip 10, for example, appears cylindrical, and more preferably is approximately cylindrical with approximately the same diameter as the clamp 28. The end cap 38 is preferably made from Nylon material, and more preferably from glass fiber filled Nylon material, and most preferably from 15% glass fiber filled Nylon material.

While the invention herein disclosed has been described by means of specific embodiments and applications thereof, numerous modifications and variations could be made thereto by those skilled in the art without departing from the scope of the invention set forth in the claims.

I claim:

1. A handlebar grip and end cap assembly comprising:
    a hollow grip residing over a handlebar end, the grip having an outside grip end with arced protrusions;
    a radially tightenable clamp residing against the outside grip end opposite the hollow grip, the clamp including:
        recesses in an inner end of the clamp for cooperation with the protrusions to grasp the grip;
        interior circumferential portions pressed against the handlebar end when the clamp is tightened;
        an outer face of the clamp facing opposite to the hollow grip;
        a mouth in the outer face; and
        an inside groove residing inside the mouth on an inside surface of the clamp and recessed from the outer face and accessible by reaching through the outer face and having an inward facing radially extending second wall;
    an end cap residing against the outer face of the clamp, the end cap comprising:
        a face facing outward opposite the hollow grip and closing an outer end of the grip;
        a cylindrical exterior surface, and
        an insertable portion opposite said face and reaching axially into the clamp and opposite the face and removably insertable through the mouth and into the clamp, the insertable portion comprising:
            a tapered portion farthest from the face at an innermost end of the insertable portion, the tapered portion tapering from a smaller outside diameter end facing into the grip to a greater outside diameter end opposite the smaller outside diameter end;
            a captured portion residing adjacent to the tapered portion and having approximately the same outside diameter as the greater outside diameter end of the tapered portion;
            a recessed portion between the captured portion and the cylindrical exterior surface and having a smaller outside diameter than the outside diameter of the captured portion; and
            a radially extending outward facing first wall between the recessed portion and the captured portion residing against the inward facing second wall of the inside groove and retaining the insertable portion of the end cap in the clamp, wherein the clamp is tightened on the insertable portion to hold the insertable portion in the clamp and loosening the clamp releases the insertable portion for removal and replacement of the end cap.

2. The handlebar grip and end cap assembly of claim 1, wherein the capture portion of the end cap reaches no further into the clamp than an outside end of the handlebar end.

3. The handlebar grip and end cap assembly of claim 2, wherein the captured portion of the end cap butts up against the outside end of the handlebar end.

4. The handlebar grip and end cap assembly of claim 1, wherein the end cap and the clamp have about the same outside diameter to provide a uniform grip.

5. The handlebar grip and end cap assembly of claim 1, wherein the insertable portion reaches axially between 0.055 inches and 0.065 inches into the clamp outer end from the cylindrical exterior surface.

6. The handlebar grip and end cap assembly of claim 1, wherein the tapered portion is tapered at between 29 degrees and 31 degrees.

7. The handlebar grip and end cap assembly of claim 6, wherein the tapered portion extends axially a distance of approximately 0.020 inches.

8. The handlebar grip and end cap assembly of claim 1, wherein the recessed portion extends axially approximately 0.030 inches.

9. The handlebar grip and end cap assembly of claim 8, wherein the recessed portion is approximately 0.008 inches deep.

10. The handlebar grip and end cap assembly of claim 1, wherein the captured portion extends axially approximately 0.010 inches.

11. The handlebar grip and end cap assembly of claim 1, wherein the clamping outer end is a split collar.

12. The handlebar grip and end cap assembly of claim 1, wherein the face of the end cap is a solid circular face.

13. The handlebar grip and end cap assembly of claim 1, wherein an axially innermost inside face of the end cap butts axially against the axially outermost outside end of the handlebar and no portion of the end cap extends axially inward past the outside end of the handlebar.

14. The handlebar grip and end cap assembly of claim 1, wherein the innermost inside face of the end cap resides axially outward of the hollow grip.

15. A handlebar grip and end cap assembly comprising:
   a hollow grip residing over a handlebar end and having an outside grip end;
   at least one protrusion extending axially out from an outside end of the hollow grip;
   a tightenable outer clamp residing adjacent to the outside grip end and grasping the at least one protrusion of the grip and having interior circumferential surfaces pressed against the handlebar end as the clamp is tightened and having no portion of the outer clamp under any portion of the hollow grip, the clamp including:
      an outer face of the clamp opposite the hollow grip;
      a cylindrical mouth; and
      an inside groove residing inside the mouth and reachable through the outer face, the inside groove having a groove face defining an outside edge of the groove and approximately orthogonal to an axial centerline through the clamp;
   an end cap residing adjacent to the outer face of the clamp and closing an outer end of the grip, the end cap comprising:
      a face facing outward from the grip;
      a cylindrical exterior surface residing between the face and the outer end of the grip; and
      an insertable portion opposite said face and protruding from said cylindrical exterior surface and removably inserted into the mouth of the outer clamp, the insertable portion comprising:
         a tapered portion at an innermost end of the insertable portion, the tapered portion tapering from a smaller diameter end facing into the grip to a greater diameter end opposite the smaller diameter end;
         a captured portion residing adjacent to the tapered portion and having approximately the same diameter as the greater diameter end of the tapered portion;
         a recessed portion adjacent to and behind the captured portion and having a smaller diameter than the captured portion; and
         an outward facing first wall extending radially between the recessed portion and the captured portion and overlapping an inward facing second wall of the outer clamp to retain the end cap in place, wherein the outer clamp is tightened on the insertable portion to hold the insertable portion in the outer clamp and loosening the outer clamp releases the insertable portion for removal and replacement of the end cap.

16. The handlebar grip and end cap assembly of claim 15, wherein the end cap and the clamp have about the same outside diameter to provide a uniform grip.

17. The handlebar grip and end cap assembly of claim 16, wherein the inside groove includes a second wall approximately orthogonal to an axis of the outer clamp and in contact with the first wall for retaining the end cap in the outer clamp.

18. The handlebar grip and end cap assembly of claim 15, wherein the capture portion of the end cap reaches no further into the clamp than an outside end of the handlebar end.

19. The handlebar grip and end cap assembly of claim 18, wherein the capture portion of the end cap butts up against the outside end of the handlebar end.

20. The handlebar grip and end cap assembly of claim 15, wherein the face of the end cap is a solid round face.

\* \* \* \* \*